(12) United States Patent
Hou et al.

(10) Patent No.: US 10,197,799 B2
(45) Date of Patent: Feb. 5, 2019

(54) METHOD FOR DESIGNING OBLIQUE CAMERA LENS

(71) Applicants: Tsinghua University, Beijing (CN); HON HAI PRECISION INDUSTRY CO., LTD., New Taipei (TW)

(72) Inventors: Wei Hou, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/691,892

(22) Filed: Aug. 31, 2017

(65) Prior Publication Data

US 2018/0180877 A1   Jun. 28, 2018

(30) Foreign Application Priority Data

Dec. 23, 2016   (CN) .......................... 2016 1 1208555

(51) Int. Cl.
*G02B 27/00* (2006.01)
*G02B 17/06* (2006.01)

(52) U.S. Cl.
CPC ......... *G02B 27/0012* (2013.01); *G02B 17/06* (2013.01); *G02B 17/0642* (2013.01)

(58) Field of Classification Search
None
See application file for complete search history.

(56) References Cited

U.S. PATENT DOCUMENTS

| | | | | |
|---|---|---|---|---|
| 5,640,283 A | * | 6/1997 | Warren | G02B 17/0642 359/366 |
| 2012/0087028 A1 | * | 4/2012 | Cook | G02B 13/08 359/850 |
| 2015/0177507 A1 | * | 6/2015 | Theriault | G02B 23/02 250/340 |
| 2016/0170191 A1 | * | 6/2016 | Hou | G02B 27/0012 359/858 |
| 2016/0202478 A1 | * | 7/2016 | Masson | G02B 26/0833 353/30 |
| 2018/0180861 A1 | * | 6/2018 | Zhu | G02B 27/0012 |
| 2018/0180877 A1 | * | 6/2018 | Hou | G02B 27/0012 |

* cited by examiner

*Primary Examiner* — Jennifer D. Carruth
(74) *Attorney, Agent, or Firm* — ScienBiziP, P.C.

(57) ABSTRACT

A method for designing a oblique camera lens comprising: step (S1), establishing an initial system, the initial system comprises a primary mirror initial structure, a secondary mirror initial structure, and a tertiary mirror initial structure; step (S2), building a new image relationship; step (S3), keeping the primary mirror initial structure and the secondary mirror initial structure unchanged; selecting a plurality of first feature rays; step (S4), keeping the secondary mirror initial structure and the tertiary mirror unchanged; selecting a plurality of fields and a plurality of second feature rays.

17 Claims, 11 Drawing Sheets

US 10,197,799 B2

METHOD FOR DESIGNING OBLIQUE CAMERA LENS

CROSS-REFERENCE TO RELATED APPLICATIONS

This application claims all benefits accruing under 35 U.S.C. § 119 from China Patent Application No. 201611208555.0, filed on Dec. 23, 2016 in the China Intellectual Property Office, disclosure of which is incorporated herein by reference. This application is related to copending applications 15/691,886, entitled, "OBLIQUE CAMERA LENS", which is filed concurrently with this application in the USPTO and disclosure of which is incorporated herein by reference.

BACKGROUND

1. Technical Field

The present disclosure relates to a method for designing oblique camera lens.

2. Description of Related Art

In conventional imaging systems, cameras lens are often used to take photos while facing the observed target/object straightly. However, in some special areas, such as high-altitude observation of obstacles on the ground, the camera can not face the object to be observed. Please see FIG. 1, an area between A and B is the area to be observed, and the observation point is C. An angle between an A field of view (FOV) and a vertical line passing through point C is referred to as an oblique angle. For the camera, point A is the nearest endpoint of the area to be observed, point B is the farthest end point of the area to be observed, and the object distance of point A and a material distance of point B is quite different. The material distance of point B is greater that of point A. In view of the photo, a resolution of point A is higher that of point B, as such, the photo resolution is not uniform. As such, an oblique camera is required to observe the object. A method for designing the oblique camera lens is also provided.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
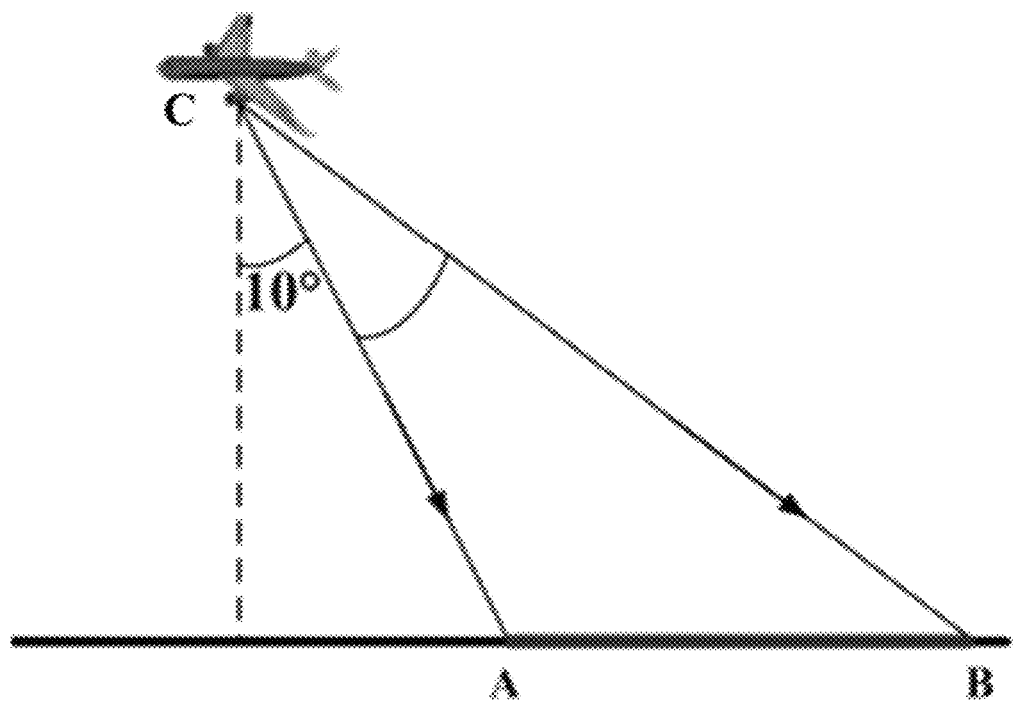
FIG. 1 is a schematic view showing a position relationship between a camera and observed points A and B.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like. It should be noted that references to "one" embodiment in this disclosure are not necessarily to the same embodiment, and such references mean at least one.

Figure 2:
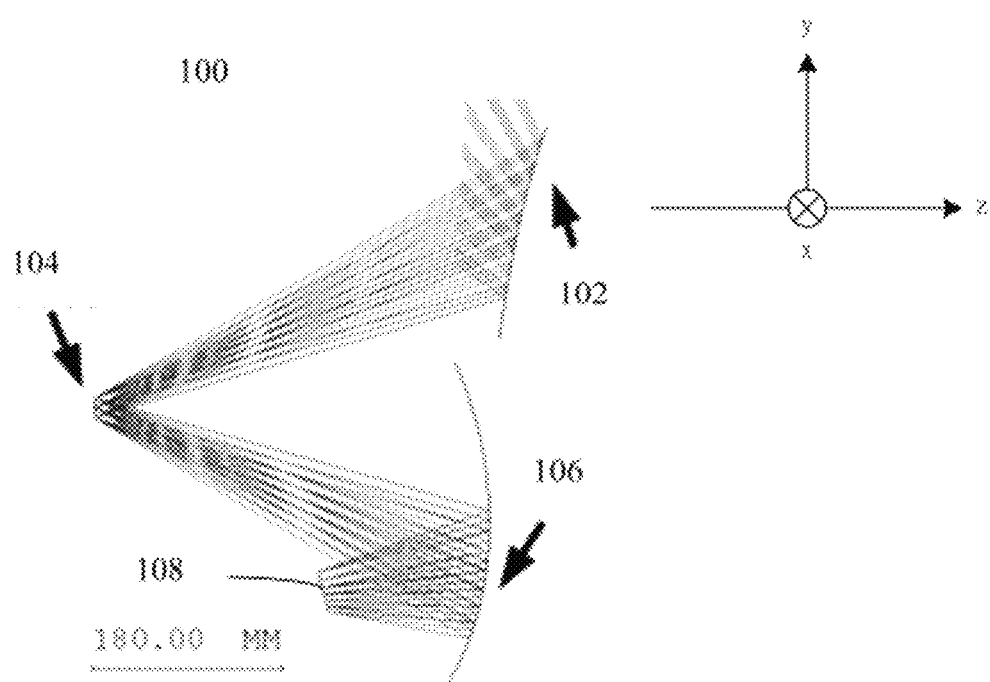
FIG. 2 is a schematic view of one embodiment of an oblique camera lens.

FIG. 2 illustrates one embodiment of an oblique camera lens 100. The oblique camera lens 100 includes a primary mirror 102, a secondary mirror 104, and a tertiary mirror 106, and an image sensor 108. The secondary mirror 104 is located on a reflected light path of the primary mirror 102. The tertiary mirror 106 is located on a reflected light path of the secondary mirror 104. The image sensor 108 is located on a reflected light path of the tertiary mirror 106. The primary mirror 102 and tertiary mirror 106 are both free surfaces, and the secondary mirror 104 is a spherical surface. The secondary mirror 104 is an aperture stop.

Referring to FIG. 1, the point C is an observation point, an area between the point A and the point B is the area to be observed, the point A is observed at 65° field of the oblique camera lens 100, the point B is observed at 35° field of the oblique camera lens 100. A working light path of the oblique camera lens 100 is as follows: an object light from the AB is incident on a reflecting surface of the primary mirror 102 and is reflected by the reflecting surface of the primary mirror 102 to form a first reflected light; the first reflected light is incident on a reflecting surface of the secondary mirror 104 and is reflected by the reflecting surface of the secondary mirror 104 to form a second reflected light; the second reflected light is incident on the tertiary mirror 106 and is reflected by the reflection surface of the tertiary mirror 106 to form a third reflected light, which is received by the image sensor 108 to form an image.

The reflecting surface of the primary mirror 102 is convex, and the reflecting surface of the tertiary mirror 106 is concave, conferring an ultra-wide FOV to the off-axis three-mirror optical system with freeform surfaces 100.

A horizontal line passing through the center of the secondary mirror 104 is defined as a Z-axis, and in the Z-axis, to the left is negative, and to the right is positive. A Y-axis is in a plane shown in FIG. 2, and in the Y-axis, in a direction perpendicular to the Z-axis, to the upward is positive, and to the downward is negative. An X-axis is perpendicular to YZ plane, and in the X-axis, in a direction perpendicular to the YZ plane, to the inside is positive, and to the outside is negative. The FOV of the oblique camera lens 100 in the y-axis direction is lager than or equal to 35° and less than or equal to 65°.

In one embodiment, each of the reflecting surface of the primary mirror 102 and the reflecting surface of the tertiary mirror 106 is an xy polynomial freeform surface. In one embodiment, each of the reflecting surfaces of the primary mirror 102 and the tertiary mirror 106 is a sixth order xy polynomial freeform surface without odd items of x. An equation of the xy polynomial freeform surface can be expressed as follows:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3 + A_{20} y^5 + A_{21} y^6 + A_{23} x^4 y^2 + A_{25} x^2 y^4 + A_{27} y^6.$$

In the equation, z represents surface sag, c represents surface curvature, k represents conic constant, while $A_i$ represents the $i^{th}$ term coefficient. In one embodiment, the values of c, k, and $A_i$ in the equation of the reflecting surface of the primary mirror 102 are listed in TABLE 1. The values of c, k, and $A_i$ in the equation of the reflecting surface of the tertiary mirror 106 are listed in TABLE 2. However, the values of c, k, and $A_i$ are not limited to TABLE 1 and TABLE 2.

TABLE 1

| | |
|---|---|
| c | 0.0017454722941919 |
| k | −0.370220176947202 |
| $A_2$ | 0.00899999999999976 |
| $A_3$ | −0.000658642004976331 |
| $A_5$ | −0.000388156831578603 |
| $A_7$ | −1.00845234050156e−006 |
| $A_9$ | 3.44785143052323e−007 |
| $A_{10}$ | −9.09497498375104e−008 |
| $A_{12}$ | −2.1461965705095e−009 |
| $A_{14}$ | −2.58936718900012e−009 |
| $A_{16}$ | 6.17247458427895e−010 |
| $A_{18}$ | 5.8161341718006e−012 |
| $A_{20}$ | −1.42226439288969e−012 |
| $A_{21}$ | −1.67670181068018e−011 |
| $A_{23}$ | −1.61489706272178e−012 |
| $A_{25}$ | −3.61090101535634e−014 |
| $A_{27}$ | 2.96725075844174e−014 |

TABLE 2

| | |
|---|---|
| c | −0.0022663233954444 |
| k | −0.137877911427001 |
| $A_2$ | −0.000876604317960913 |
| $A_3$ | −0.000327909476515856 |
| $A_5$ | −0.00028841099866956 |
| $A_7$ | 1.65465628748813e−006 |
| $A_9$ | 1.05474315966924e−006 |
| $A_{10}$ | 5.71091387012652e−008 |
| $A_{12}$ | −6.61918406198728e−009 |
| $A_{14}$ | −3.12149077600531e−009 |
| $A_{16}$ | 5.79412604911529e−011 |
| $A_{18}$ | 1.41667391666226e−011 |
| $A_{20}$ | −5.78183876722764e−012 |
| $A_{21}$ | −3.9085412033913e−012 |
| $A_{23}$ | 1.3549236784204e−012 |
| $A_{25}$ | −1.91373381734072e−013 |
| $A_{27}$ | −1.04655761173843e−013 |

The reflecting surface of the secondary mirror 104 is a spherical surface. An equation of the spherical surface can be expressed as follows:

$$z(x, y) = \frac{c(x^2 + y^2)}{1 + \sqrt{1 - c^2(x^2 + y^2)}}.$$

In the equation of the spherical surface, z represents surface sag, and c represents surface curvature. In one embodiment, c=5.03064529008e-5. However, the value of c can be selected according to actual need.

Materials of the primary mirror 102, the secondary mirror 104, and the tertiary mirror 106 can be aluminum, beryllium, or other metals. The materials of the primary mirror 102, the secondary mirror 104, and the tertiary mirror 106 can also be silicon carbide, quartz, or other mineral or inorganic materials. A reflection enhancing coating can also be put on the metals or inorganic materials to enhance the reflectivity performance of the three mirrors. In one embodiment, the reflection enhancing coating is a gold film.

A distance between the primary mirror 102 and the secondary mirror 104, along a Z-axis direction, is in a range from about 399 mm to about 400 mm. A distance between the secondary mirror 104 and the tertiary mirror 106, along the Z-axis direction, is in a range from about 373 mm to about 374 mm. A distance between the tertiary mirror 106 and the image sensor 108, along the Z-axis direction, is in a range from about 156 mm to about 157 mm. In one embodiment, the distance between the primary mirror 102 and the secondary mirror 104, along the Z-axis direction, is −399.9068 mm. A distance between the secondary mirror 104 and the tertiary mirror 106, along the Z-axis direction, is 373.7318 mm. A distance between the tertiary mirror 106 and the image sensor 108, along the Z-axis direction, is −156.7313 mm.

The image sensor 108 can be a charge-coupled device (CCD) type or a complementary metal-oxide semiconductor (CMOS) type. In one embodiment, a planar array CCD is employed as the image sensor 108, and a pixel size of the planar array CCD is about 5 μm×5 μm.

An effective entrance pupil diameter of the oblique camera lens 100 is about 13 mm. The primary mirror 102, the secondary mirror 104, and the tertiary mirror 106 adopt an off-axis FOV in Y-axis direction. The FOV of the oblique camera lens 100 is greater than or equal to 35° and less than or equal to 65°.

An effective focal length (EFL) of the oblique camera lens 100 is about 75 mm.

A wavelength of the oblique camera lens 100 is not limited. In one embodiment, the wavelength of the oblique camera lens 100 is in visible spectrum.

Figure 3:
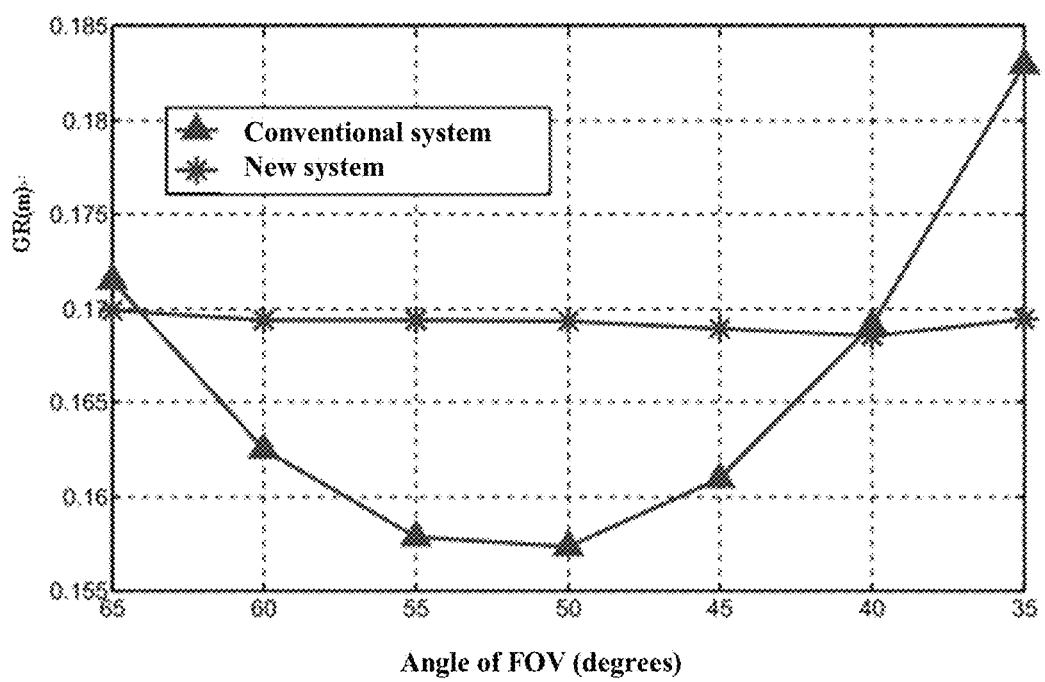
FIG. 3 is a graph comparing a photo resolution of one embedment of an oblique camera lens and a conventional photo resolution of a conventional camera.

Referring to FIG. 3, FIG. 3 is a comparing graph between a ground resolution (GR) of the oblique camera lens 100 (new system) according to one embodiment of the present invention and a ground resolution (GR) of a conventional optical system (conventional system). Between the FOV of 35° and 65°, the imaging resolution of the oblique camera lens 100 is substantially uniform between the point A and point B. Between the FOV of 35° and 65°, the ground resolution (GR) of the conventional optical system changes greatly, which will affect the quality of the image.

Figure 4:
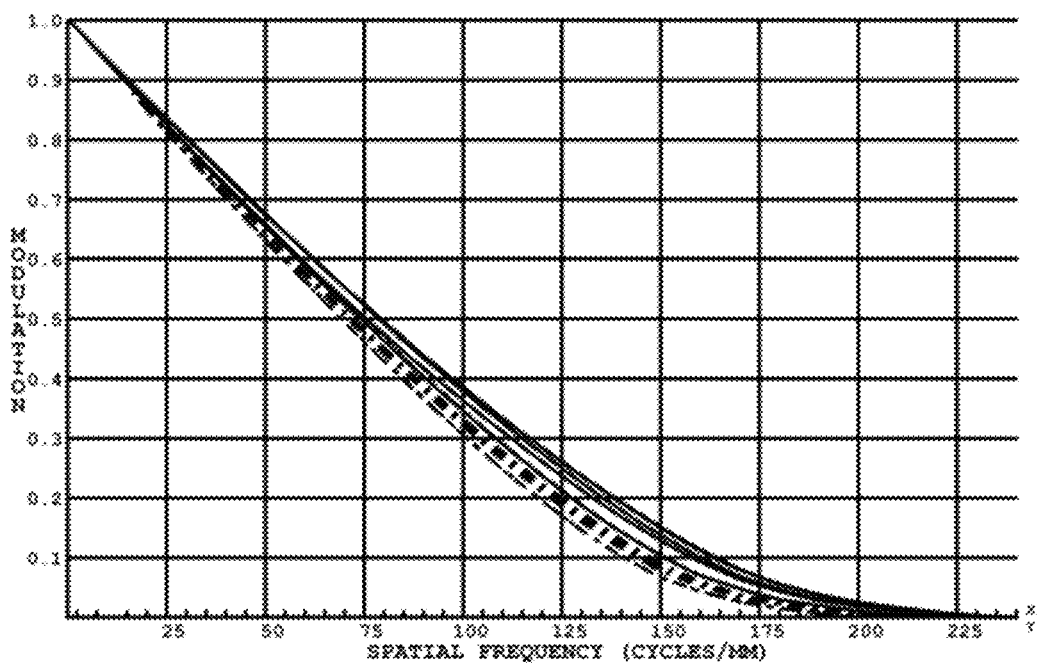
FIG. 4 is a transfer function diagram of the oblique camera lens according to one embodiment.
Figure 5:
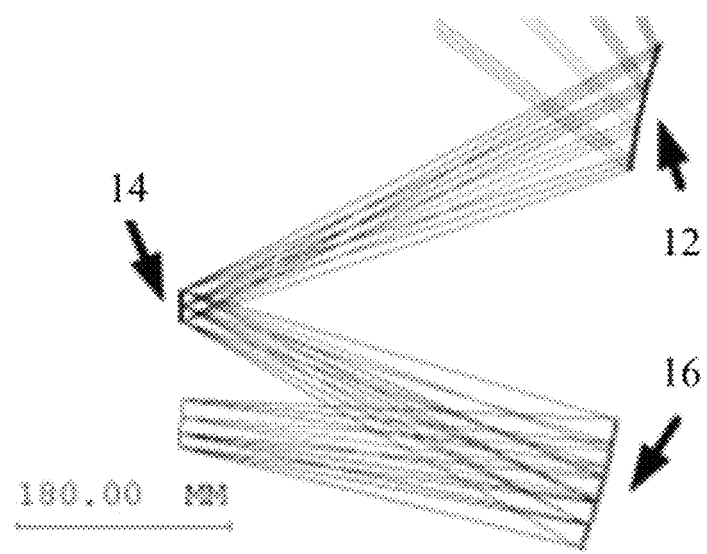
FIG. 5 is an optical path and a schematic diagram of an initial system provided by one embodiment.

Referring to FIG. 4, FIG. 4 shows the modulation transfer function (MTF) at the visible light band. As can be seen from FIG. 4, the MTF of each field of view in the oblique camera lens 100 is close to diffraction limit, which proves that the oblique camera lens 100 has a good image quality.

Compared with the prior art, the oblique camera lens provided by the present invention has the following advantages: the oblique camera lens can obtain an image with a uniform resolution; the oblique camera lens is off-axis three-mirror optical system, the primary mirror and the tertiary mirror are both freeform surfaces, such surfaces are asymmetric and allow more degrees of freedom in design.

A method for designing the oblique camera lens 100 includes the following steps:

step (S1), establishing an initial system 10, the initial system 10 includes a primary mirror initial structure 12, a secondary mirror initial structure 14, and a tertiary mirror initial structure 16;

step (S2), building a new image relationship, which is based on a formula of:

$$FFL(\omega) = \frac{p \times H}{GR(\omega) \times \cos^2(75° - \omega)}$$

wherein, $\omega$ is a field angle, p is value of a single pixel unit, H is an altitude of the oblique camera;

step (S3), keeping the primary mirror initial structure 12 and the secondary mirror initial structure 14 unchanged; selecting a plurality of first feature rays, the plurality of first feature rays are forward rays tracked from an object space to the image sensor (not shown); and calculating a plurality of first feature data points $P_i$ (i=1, 2 ... K) point by point based on the object-image relationship of the plurality of first feature rays, to obtain the tertiary mirror 16 by surface fitting the plurality of first feature data points $P_i$ (i=1, 2 ... K);

step (S4), keeping the secondary mirror initial structure 14 and the tertiary mirror 16 unchanged; selecting a plurality of fields and a plurality of second feature rays, the plurality of second feature rays are reverse rays tracked from the image sensor to the object space; and calculating a plurality of second feature data points $P_i'$ (i=1, 2 ... K) point by point based on the object-image relationship of the plurality of second feature rays, to obtain the primary mirror 12 by surface fitting the plurality of second feature data points $P_i'$ (i=1, 2 ... K).

In step (S1), the primary mirror initial structure 12, the secondary mirror initial structure 14, and the tertiary mirror initial structure 16 can be planar, spherical, or other surface types. A location of the primary mirror initial structure, a location of the secondary mirror initial structure and a location of the tertiary mirror initial structure can be selected according to the actual need of the imaging systems. As long as a plurality of intersections of the emitted light rays and the image sensor are close to the image points.

Figure 6:
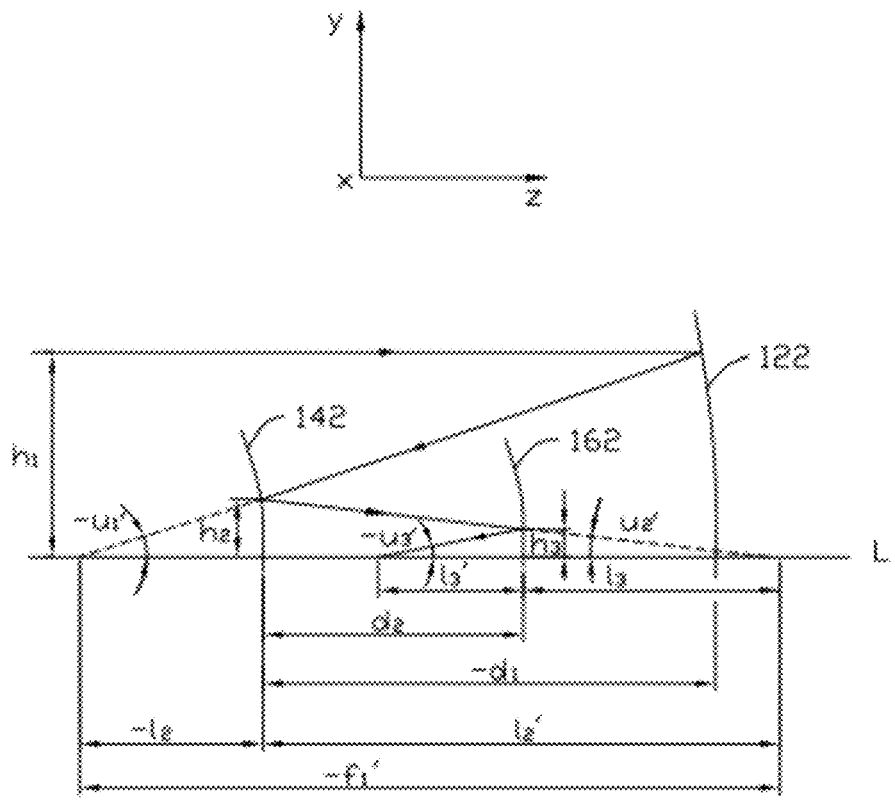
FIG. 6 is a schematic view of an initial system according to one embodiment.

FIG. 6 illustrates in one embodiment, the initial system is a spherical system. A horizontal line through the center of the aperture stop is defined as a reference axis L. $\Phi$ is the focal power of the spherical system. $c_1$, $c_2$, $c_3$ are respectively the surface curvature of the primary mirror initial structure 12, the secondary mirror initial structure 14, and the tertiary mirror initial structure 16. $d_1$ is the distance between the primary mirror initial structure 12 and the secondary mirror initial structure 14, $d_2$ is the distance between the secondary mirror initial structure 14 and the tertiary mirror initial structure 16, and $l_3'$ is the distance between the tertiary mirror initial structure 16 and the image sensor. $f_1'$ is the focal length of the primary mirror initial structure 12, and $f'$ is the focal length of the spherical system. $h_1$ is the vertical distance between the reference axis L and the intersection of the lights and the primary mirror initial structure 12, $h_2$ is the vertical distance between the reference axis L and the intersection of the lights and the secondary mirror initial structure 14, and $h_3$ is the vertical distance between the reference axis L and the intersection of the lights and the tertiary mirror initial structure 16. $r_1$, $r_2$, $r_3$ are respectively the radii of the primary mirror initial structure 12, the secondary mirror initial structure 14, and the tertiary mirror initial structure 16. The following formula can be established based on the paraxial optical theory.

$$u_1' = 2c_1 h_1, \tag{1}$$

$$u_2' = h_2/l_2', \tag{2}$$

$$h_2/h_1 = l_2/f_1', \tag{3}$$

$$\frac{1}{l_2'} + \frac{1}{l_2} = \frac{2}{r_2}, \tag{4}$$

$$l_2 = f_1' - d_1. \tag{5}$$

So $$u_2' = -2h_1(c_1 - c_2 + 2d_1 c_1 c_2) \tag{6, and}$$

$$h_2 = h_1(1 - 2d_1 c_1) \tag{7}$$

Similarly, $$|u_3' = (h_2 - u_2' d_2)/l_3'| \tag{8}$$

From $u_3'$, $$|1/f' = \Phi = u_3'/h_1| \tag{9}$$

So $$|l_3'\Phi = 1 - 2d_1 c_1 - 2d_2 c_2 + 2d_2 c_1 + 4d_1 d_2 c_1 c_2| \tag{10}$$

To $r_3$, $$|u_3' l_3' = u_2' l_3| \tag{11, and}$$

$$\overline{|l_3' = l_3(2l_3'/r_3 - 1)|} \tag{12}$$

That is $$u_3' = 2c_3 l_3' u_3' - u_2' \tag{13}$$

Then divided by $h_1$, $$\Phi = 2c_3 l_3' \Phi + 2c_1 - 2c_2 + 4d_1 c_1 c_2 \tag{14}$$

The field curvature $S_{IV}$ should be kept as zero, so Eq. (15) can be derived based on the primary aberration theory, $$c_1 + c_3 = c_2 \tag{15}$$

When the focal power Φ and $d_1$, $d_2$, $l_3'$ are determined, from the Eq. (10), (14) and (15), the radii of the primary mirror initial structure 12, the secondary mirror initial structure 14, and the tertiary mirror initial structure 16 can be solved.

The optical power of the primary mirror initial structure 12 can be positive or negative, depending on the focal power Φ and $d_1$, $d_2$, $l_3'$.

Figure 7:
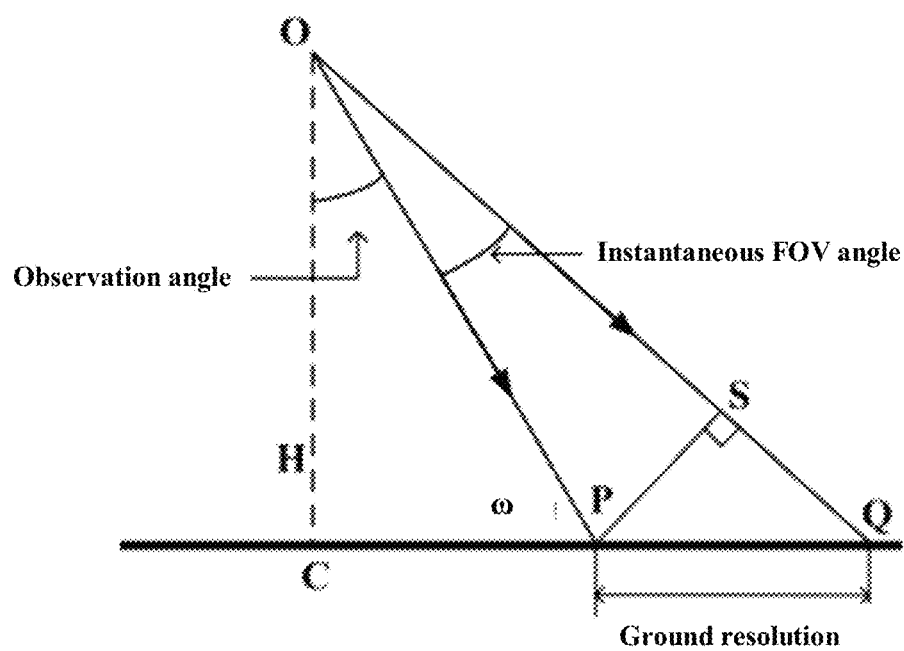
FIG. 7 is a schematic view showing a relationship between the ground resolution and an instantaneous FOV of the oblique camera lens according to one embodiment.

In step (S2), FIG. 7 shows a relationship between the ground resolution and the instantaneous FOV angle, H is the altitude of the oblique camera, and ∠POQ is the instantaneous FOV corresponding to the field angle ω. In FIG. 7, the instantaneous FOV angle is enlarged; in fact, the instantaneous FOV angle is very small. PQ is the ground resolution corresponding to the field angle ω to be evaluated. From the P point for the OQ vertical line, PS perpendicular to the OQ. In FIG. 7, ∠COP is the observation angle of the FOV angle ω, the FOV angle ω is larger than or equal to 35° and less than or equal to 65°, and the far observation point is observed at 35° FOV angle, the near observation point is observed at 65° FOV angle. As the FOV angle increases, the distance from the observation point is getting closer. That is, the observation angle corresponding to the 35° FOV angle is 40°, and the observation angle corresponding to 65° FOV angle is 10°. As such, the observation angle ∠COP=75°−ω. In order to facilitate the calculation, an approximate method is used to calculate the relationship between the ground resolution and FOV focal length. Since ∠POQ is very small, therefore, ∠COP≈∠COQ, and ∠CPO≈∠CQO, therefore, ∠OPS≈∠COP, as such:

$$PS = PQ \times \cos(\angle OPS) \approx PQ \times \cos(\angle COP) \quad (16)$$

Further, because the instantaneous FOV angle is very small, PQ is very small, and, OP≈OS, as such:

$$\tan(\angle POQ) = \frac{\overline{PS}}{\overline{OS}} \approx \frac{\overline{PS}}{\overline{OP}} \approx \frac{PQ \times \cos(\angle COP)}{\overline{OP}} \approx \frac{PQ \times \cos(\angle COP)}{H/\cos(\angle COP)} \quad (17)$$

$$\tan(\angle POQ) = \frac{p}{FFL(\omega)} \quad (18)$$

wherein p is value of a single pixel unit, and EFL(ω) is the FOV focal length. If PQ is represented by GR(ω), a formula (19) is obtained by calculating formulas (16), (17) and (18), the formula (19) is:

$$FFL(\omega) = \frac{p \times H}{GR(\omega) \times \cos^2(75° - \omega)} \quad (19)$$

Figure 8:
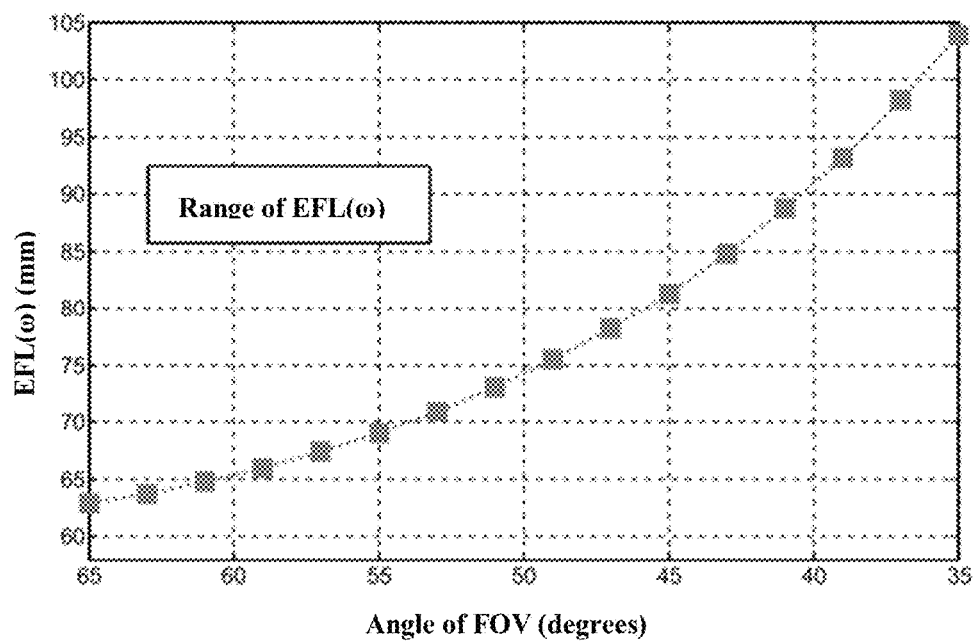
FIG. 8 is a graph showing the relationship between the field focal length of each field and the FOV of an oblique camera lens according to one embodiment.

After the formula (19) is obtained, the ground resolution, the value of a single pixel unit p and the altitude of the oblique camera H are known, and ω is ranged from 35° to 65°, a range of EFL(ω) can be calculated, which is shown in FIG. 8.

The field focal length FFL (ω) can be expressed by a formula of:

$$FFL(\omega) = \frac{\Delta h}{\Delta \omega}$$

wherein Δω is a change of ω, h is a height of an object, and Δh is a change of h.

Therefore, after the range of FFL(ω) is obtained, the height of the object can be calculated under different field angle, and the height of the object is the new image relationship.

In step (S3), a light path of the plurality of first feature rays can be depicted as follows. First, the plurality of first feature rays from the object space reaches the primary mirror initial structure 12, and is reflected by the primary mirror initial structure 12 to form a first reflected light $R_1$. Second, the first reflected light $R_1$ reaches the secondary mirror initial structure 14, and is reflected by the secondary mirror initial structure 14 to form a second reflected light $R_2$. Third, the second reflected light $R_2$ reaches the tertiary mirror initial structure 16, and is reflected by the tertiary mirror initial structure 16 to form a third reflected light $R_3$. Finally, the third reflected light $R_3$ is received by the image sensor.

The selecting of the plurality of first feature rays includes steps of: M fields are selected according to the optical systems actual need, an aperture of each of the M fields is divided into N equal parts, and P feature rays at different aperture positions in each of the N equal parts are selected. As such, K=M×N×P first feature rays correspond to different aperture positions and different fields are fixed. The aperture can be a circle, a rectangle, a square, an oval or other shapes.

When the aperture of each of the M fields is a circle, a circular aperture of each of the M fields is divided into N angles with equal interval φ, as such, N=2π/φ, then, P different aperture positions are fixed along a radial direction of each of the N angles. Therefore, K=M×N×P first feature rays correspond to different aperture positions and different fields are fixed. In one embodiment, five fields are fixed in the construction process; a circular aperture of each of the five fields is divided into eight angles with equal intervals, and five different aperture positions are fixed along the radial direction of each of the fourteen angles. Therefore, 200 first feature rays corresponding to different aperture positions and different fields are fixed.

Figure 9:
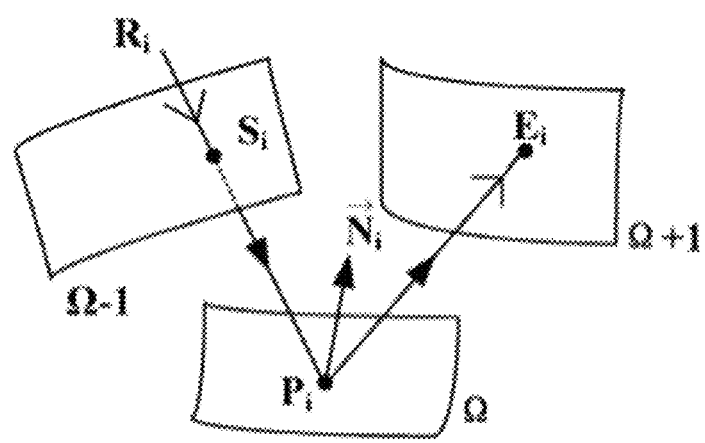
FIG. 9 is a schematic view of start point and end point of one feature ray while solving the feature data points according to one embodiment.
Figure 10:
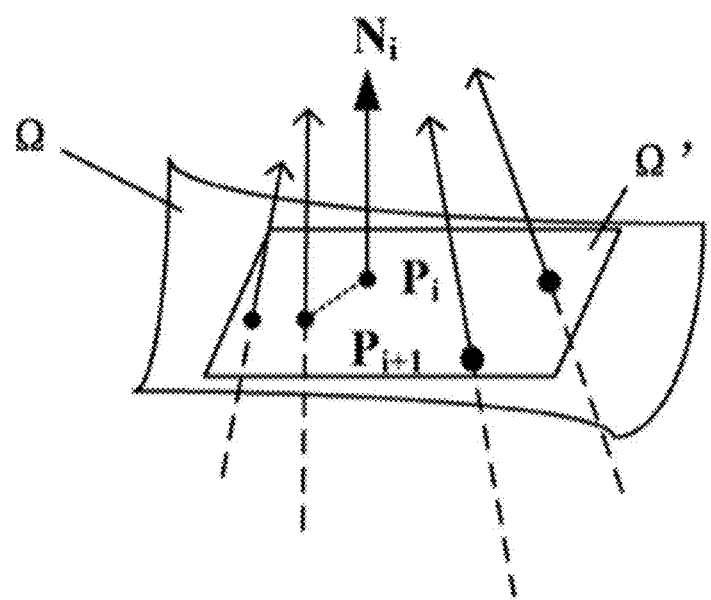
FIG. 10 is a schematic view of a tangent plane while solving the feature data points according to one embodiment.

FIGS. 9 and 10 illustrate a surface Ω is defined as the unknown freeform surface, a surface Ω−1 is defined as a surface located adjacent to and before the surface Ω, and a surface Ω+1 is defined as a surface located adjacent to and behind the surface Ω, The intersections of the plurality of first feature rays $R_i$(i=1, 2 . . . K) with the surface Ω are defined as the first feature data points $P_i$(i=1, 2 . . . K). The first feature data points $P_i$(i=1, 2 . . . K) can be obtained by the intersections of the feature rays $R_i$(i=1, 2 . . . K) with the surface Ω−1 and the surface Ω+1. The plurality of feature rays $R_i$(i=1, 2 . . . K) are intersected with the surface Ω−1 at a plurality of start points $S_i$ (i=1, 2 . . . K), and intersected with the surface Ω+1 at a plurality of end points $E_i$(i=1, 2 . . . K). When the surface Ω and the plurality of first feature rays $R_i$(i=1, 2 . . . K) are determined, the plurality of start points $S_i$ (i=1, 2 . . . K) of the feature rays $R_i$ (i=1, 2 . . . K) can also be determined. The plurality of end points $E_i$ (i=1, 2 . . . K) can be obtained based on the object-image relationship and Fermat's principle. Under ideal conditions, the plurality of first feature rays $R_i$ (i=1, 2 . . . K) emitted from the plurality of start points $S_i$ (i=1, 2 . . . K) on the surface Ω−1, pass through the plurality of first feature data points $P_i$(i=1, 2 . . . K) on the surface Ω, intersect with the surface Ω+1 at the plurality of end points $E_i$(i=1, 2 . . . K), and finally intersect with the image sensor.

In step (S3), the unknown freeform surface is the tertiary mirror 16, the surface Ω−1 is the secondary mirror initial structure 14, and the surface Ω+1 is the image sensor. The start point $S_i$ of each first feature ray is the intersection of the first feature ray and the secondary mirror initial structure 14, and the end points $E_i$ of each first feature ray is the ideal image point on the image sensor.

The unit normal vector $\vec{N}_i$ at each of the first feature data point $P_i$ (i=1, 2 ... K) can be calculated based on the vector form of Snell's Law. When the unknown freeform surface is a reflective surface, $$\vec{N}_i = \frac{\vec{r}_i' - \vec{r}_i}{|\vec{r}_i' - \vec{r}_i|}, \vec{r}_i = \frac{\overrightarrow{S_i P_i}}{|\overrightarrow{S_i P_i}|}$$

is a unit vector along a direction of an incident ray of the unknown freeform surface;

$$\vec{r}_i' = \frac{\overrightarrow{P_i E_i}}{|\overrightarrow{P_i E_i}|}$$

is a unit vector along a direction of an exit ray of the unknown freeform surface.

The unit normal vector $\vec{N}_i$ at the first feature data points $P_i$(i=1, 2 ... K) is perpendicular to the tangent plane at the first feature data points $P_i$(i=1, 2 ... K). Thus, the tangent planes at the feature data points $P_i$(i=1, 2 ... K) can be obtained.

The plurality of first feature data points $P_i$(i=1, 2 ... K) can be obtained by the following calculating methods.

Step (31): defining a first intersection of the first feature ray $R_1$ and the tertiary mirror initial structure 16 as the first feature data point $P_i$;

Step (32): calculating the unit normal vector $\vec{N}_1$| at the first feature data points $P_1$ based on the vector form of Snell's Law;

Step (33): making a tangent plane Ω' at the first feature data points $P_1$, thus, (K−1) intersections can be obtained by the tangent plane Ω' intersecting with remaining (K−1) first feature rays, and the intersection which is nearest to the first feature data points $P_1$, is fixed from the (K−1) intersections as the next first feature data point $P_2$;

Step (34): repeating steps 32 and 33, after i (2≤i≤K−1) first feature data points are all calculated; calculating the unit normal vector $\vec{N}_i$ at the first feature data point $P_i$(2≤i≤K−1) based on the vector form of Snell's Law; making the tangent plane at the first feature data point $P_i$(2≤i≤K−1), thus, (K−i) intersections can be obtained by the tangent plane intersecting with remaining (K−i) first feature rays, and the intersection which is nearest to the first feature data points $P_i$(2≤i≤K−1), is fixed from the (K−i) intersections as the next first feature data point $P_{i+1}$(2≤i≤K−1), until all the plurality of first feature data points $P_i$(i=1, 2 ... K) are calculated.

In Step (31), the first feature ray $R_1$ can be any one of the plurality of first feature rays. In one embodiment, the first feature ray that is closest to the optical axis of the off-axis three-mirror imaging system with freeform surfaces is set as the first feature ray $R_1$, which is beneficial to keeping the primary mirror 102 and the tertiary mirror 106 at approximate continuous tangent. Therefore, the primary mirror 102 and the tertiary mirror 106 can be fabricated on one element, and the oblique camera lens 100 is easier to be assembled and aligned.

An equation of the tertiary mirror 160 can be obtained by surface fitting the plurality of first feature data points $P_i$(i=1, 2 ... K). The equation can be Zernike polynomials, XY polynomials, or Non-uniform rational B-spline (NURBS).

In step (S4), a light path of the plurality of second feature rays can be depicted as follows. First, the plurality of second feature rays from the image sensor 108 reaches the tertiary mirror 106, and is reflected by the tertiary mirror 106 to form a first reflected light $R'_1$. Second, the first reflected light $R'_1$ reaches the secondary mirror initial structure 14, and is reflected by the secondary mirror initial structure 14 to form a second reflected light $R'_2$. Third, the second reflected light $R'_2$ reaches the primary mirror initial structure 12, and is reflected by the primary mirror initial structure 12 to form a third reflected light $R'_3$. Finally, the third reflected light $R'_3$ is received by the object space.

Figure 11:
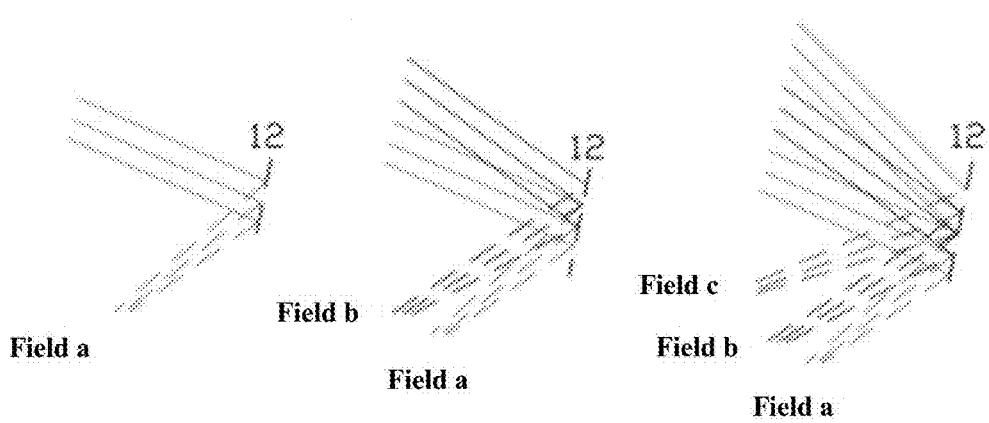
FIG. 11 is a schematic view of a selecting method of fields while solving mirrors according to one embodiment.

FIG. 11 illustrates the selecting the plurality of fields includes steps of: (I): selecting a field "a"; (II): selecting a field "b", and the chief ray of the field "b" and the primary mirror initial structure 12 are substantially intersect at the intersection of the margin ray of the field "a" and the primary mirror initial structure 12; repeating steps (I) and (II), until the plurality of fields are all selected, and adjacent fields on the primary mirror initial structure 12 are partially overlapping, such as the field "a", the field "b", and a field "c" shown in FIG. 11.

In one embodiment, adjacent fields on the primary mirror initial structure 12 are approximately 30%-70% overlapping. Such an overlap allows a higher accuracy of surface fitting, and keep the primary mirror 102 continuous and smooth. When the overlap between the last two fields can not reach 30%-70%, the last field can be extended to larger than the maximum FOV, so as to keep adjacent fields on the primary mirror initial structure 12 approximately 30%-70% overlapping.

In one embodiment, ten fields are fixed, the field "a" is the minimum field, and adjacent fields on the primary mirror initial structure 12 are approximately 50% overlapping.

The selecting the plurality of second feature rays is the same as selecting the plurality of first feature rays.

In step (S4), the unknown freeform surface is the primary mirror 102, the surface Ω−1 is the secondary mirror initial structure 14, and the surface Ω+1 can be a virtual surface. The start point $S_i$ of each second feature ray is the intersection of the second feature ray and the secondary mirror initial structure 14, and the end points $E_i$ of each second feature ray is the intersection of the second feature ray and the virtual surface. Other characteristics of the calculating method of the plurality of second feature data points $P'_i$ (i=1, 2 ... K) are the same as the calculating method of the plurality of second feature data points $P_i$ (i=1, 2 ... K).

An order of steps (S3) and (S4) can be changed according to the actual need.

In other embodiment, in optional, a further step of optimizing the oblique camera lens 100 can be provided.

The method for designing the off-axis three-mirror imaging system with freeform surfaces can be implemented via computer software.

The method for designing the oblique camera lens 100 can have many advantages.

The primary mirror is obtained by a reverse ray tracing, the primary mirror is traced after the aperture stop, and thus, the changes of the optical power of the primary mirror during the designing process will not affect the size and position of the entrance pupil.

Adjacent fields on the primary mirror initial structure 12 are partially overlapping, which can avoid lower accuracy of surface fitting caused by narrow beams, and keep the primary mirror 102 continuous and smooth.

The method can be applied in imaging systems with multi-fields and certain aperture, by controlling the feature rays of the multi-fields and different aperture positions, and the number of fields is not limited, thus, the designing method has broad applications.

Given the object-image relationships and the spherical initial system, each freeform surface of the oblique camera lens can be generated by a point by point imaging constructing method. Thus, the method for designing oblique camera lens is simple and can be applied to various off-axis asymmetric systems.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for designing an oblique camera lens comprising:
   step (S1), establishing an initial system, the initial system comprises a primary mirror initial structure, a secondary mirror initial structure, and a tertiary mirror initial structure;
   step (S2), building a new image relationship, a field focal length FFL ($\omega$) is based on a formula of:

$$FFL(\omega) = \frac{p \times H}{GR(\omega) \times \cos^2(75° - \omega)}$$

wherein, $\omega$ is a field angle, p is value of a single pixel unit, H is an altitude of the oblique camera;
   step (S3), keeping the primary mirror initial structure and the secondary mirror initial structure unchanged; selecting a plurality of first feature rays, the plurality of first feature rays are forward rays tracked from an object space to the image detector; and calculating a plurality of first feature data points $P_i$(i=1, 2 . . . K) point by point based on the object-image relationship of the plurality of first feature rays, to obtain the tertiary mirror by surface fitting the plurality of first feature data points $P_i$(i=1, 2 . . . K);
   step (S4), keeping the secondary mirror initial structure and the tertiary mirror unchanged; selecting a plurality of fields and a plurality of second feature rays, the plurality of second feature rays are reverse rays tracked from the image detector to the object space; and calculating a plurality of second feature data points $P_i'$ (i=1, 2 . . . K) point by point based on the object-image relationship of the plurality of second feature rays, to obtain the primary mirror by surface fitting the plurality of second feature data points $P_i'$ (i=1, 2 . . . K).

2. The method of claim 1, wherein the primary mirror initial structure, the secondary mirror initial structure, or the tertiary mirror initial structure is planar or spherical.

3. The method of claim 1, wherein a field angle of the oblique camera lens is in a range from is lager than or equal to 35° and less than or equal to 65°.

4. The method of claim 1, wherein field focal length FFL ($\omega$) is expressed by a formula of:

$$FFL(\omega) = \frac{\Delta h}{\Delta \omega}$$

wherein $\Delta \omega$ is a change of $\omega$, h is a height of an object, and $\Delta h$ is a change of h.

5. The method of claim 4, wherein after the range of FFL($\omega$) is obtained, the height of the object can be calculated under different field angle, and the height of the object is the new image relationship.

6. The method of claim 1, wherein the selecting the plurality of first feature rays comprises: selecting M fields; dividing an aperture of each of the M fields into N equal parts; and P feature rays at different positions in each of the N equal parts are selected, thus, K=M×N×P different first feature rays are selected.

7. The method of claim 6, wherein the aperture of each of the M fields is circle, the aperture of each of the M fields is divided into N angles with equal intervals, and P different positions are selected along a radial direction of each of the N angles.

8. The method of claim 1, wherein the calculating the plurality of first feature data points comprises:
   defining a first intersection of the first feature ray $R_1$ and the tertiary mirror initial structure as the first feature data point $P_1$;
   calculating an unit normal vector $\vec{N}_i$ at the first feature data point $P_i$ ($1 \leq i \leq K-1$) based on a vector form of Snell's Law after i ($1 \leq i \leq K-1$) first feature data points are calculated; and
   making a tangent plane at the first feature data point $P_i$ ($1 \leq i \leq K-1$), thus, (K-i) intersections are obtained by the tangent plane intersecting with remaining (K-i) first feature rays; and the intersection, which is nearest to the first feature data points $P_1$ ($1 \leq i \leq K-1$), is fixed from the (K-i) intersections as the next first feature data point $P_{i+1}$ ($1 \leq i \leq K-1$), until all the plurality of first feature data points $P_i$ (i=1, 2 . . . K) are calculated.

9. The method of claim 8, wherein the first feature ray $R_1$ is closest to the optical axis of the off-axis three-mirror imaging system with freeform surfaces.

10. The method of claim 8, wherein the unit normal vector $\vec{N}_i$ is calculated as follows:

$$\vec{N}_i = \frac{\vec{r}_i' - \vec{r}_i}{|\vec{r}_i' - \vec{r}_i|}; \text{ wherein } \vec{r}_i = \frac{\overrightarrow{P_i S_i}}{|\overrightarrow{P_i S_i}|}$$

is an incident ray direction unit vector of the tertiary mirror;

$$\vec{r}_i' = \frac{\overrightarrow{E_i P_i}}{|\overrightarrow{E_i P_i}|}$$

is an exit ray direction unit vector of the tertiary mirror; $S_i$ are intersections of the plurality of first feature rays and the secondary mirror initial structure, and $E_i$ are ideal image points on the image detector.

11. The method of claim 1, wherein the calculating the plurality of second feature data points $P'_i$ (i=1, 2 . . . K) comprises:

defining a first intersection of the second feature ray $R'_1$ and the primary mirror initial structure as the second feature data point $P'_1$;

calculating an unit normal vector $\vec{N}_i$ at the second feature data point $P'_i$ (1≤i≤K−1) based on a vector form of Snell's Law after i (1≤i≤K−1) second feature data points are calculated; and making a tangent plane at the second feature data point $P'_i$ (1≤i≤K−1), thus, (K−i) intersections are obtained by the tangent plane intersecting with remaining (K−i) second feature rays; and the intersection, which is nearest to the second feature data points $P'_i$ (1≤i≤K−1), is fixed from the (K−i) intersections as the next second feature data point $P'_{i+1}$ (1≤i≤K−1), until all the plurality of second feature data points $P'_i$ (i=1, 2 . . . K) are calculated.

12. The method of claim 11, wherein the second feature ray $R'_1$ is closest to the optical axis of the off-axis three-mirror imaging system with freeform surfaces.

13. The method of claim 11, wherein the unit normal vector $|\vec{N}_i'|$ is calculated as follows:

$$\vec{N_i'} = \frac{\vec{r}_i' - \vec{r}_i}{|\vec{r}_i' - \vec{r}_i|}; \text{ wherein } \vec{r}_i = \frac{\vec{P_i'S_i'}}{|\vec{P_i'S_i'}|}$$

is an incident ray direction unit vector of the primary mirror;

$$\vec{r}_i' = \frac{\vec{E_i'P_i'}}{|\vec{E_i'P_i'}|}$$

is an exit ray direction unit vector of the primary mirror; $S_i'$ are intersections of the plurality of second feature rays and the secondary mirror initial structure, and $E_i$ are intersections of the plurality of second feature rays and a virtual surface located adjacent to and before the primary mirror.

14. The method of claim 1, wherein the selecting the plurality of fields comprises:
(I): selecting a field "a";
(II): selecting a field "b", and a chief ray of the field "b" and the primary mirror initial structure substantially intersect at the intersection of a margin ray of the field "a" and the primary mirror initial structure; and
(III) repeating steps (I) and (II), until the plurality of fields are all selected, and adjacent fields on the primary mirror initial structure are partially overlapping.

15. The method of claim 14, wherein adjacent fields on the primary mirror initial structure are 30%-70% overlapping.

16. The method of claim 15, wherein adjacent fields on the primary mirror initial structure are about 50% overlapping.

17. The method of claim 1, wherein the plurality of second feature rays transport as follows; firstly, the plurality of second feature rays from the image detector reaches the tertiary mirror, and is reflected by the tertiary mirror to form a first reflected light; secondly, the first reflected light reaches the secondary mirror initial structure, and is reflected by the secondary mirror initial structure to form a second reflected light; thirdly, the second reflected light reaches the primary mirror initial structure, and is reflected by the primary mirror initial structure to form a third reflected light; finally, the third reflected light is received by the object space.

* * * * *